UNITED STATES PATENT OFFICE.

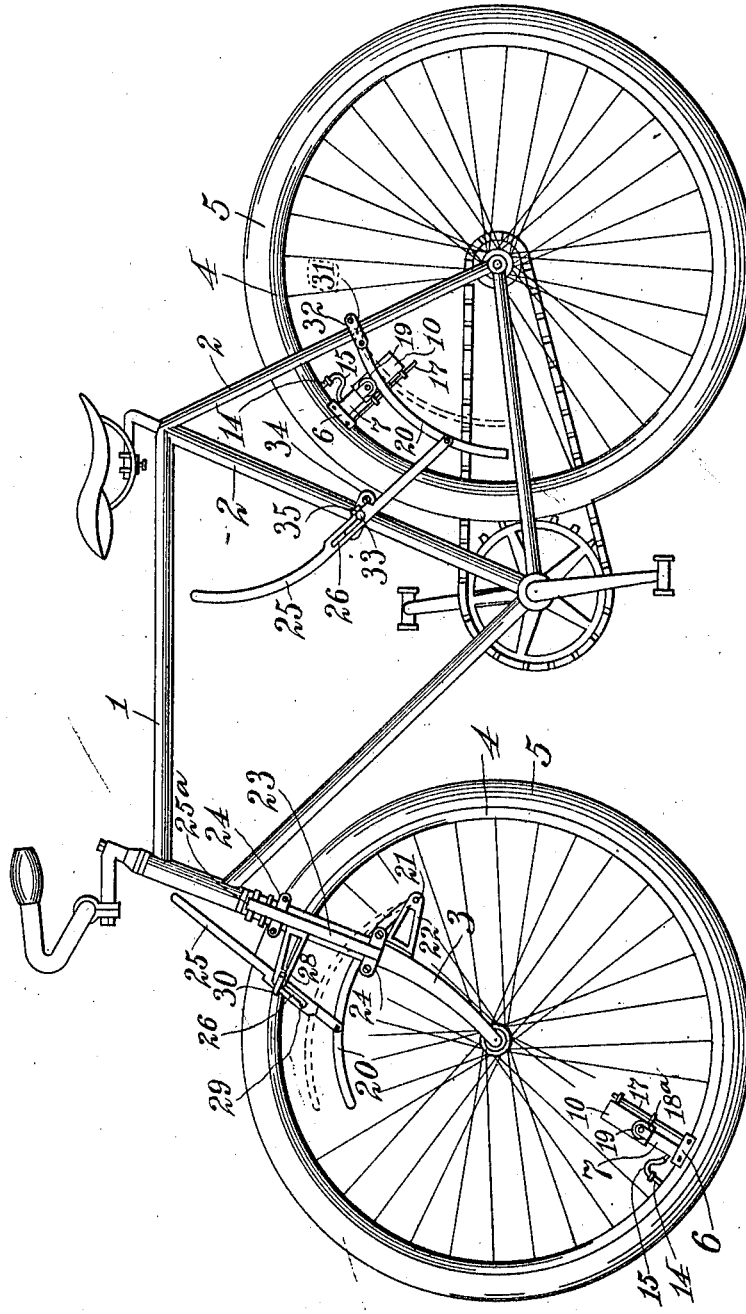

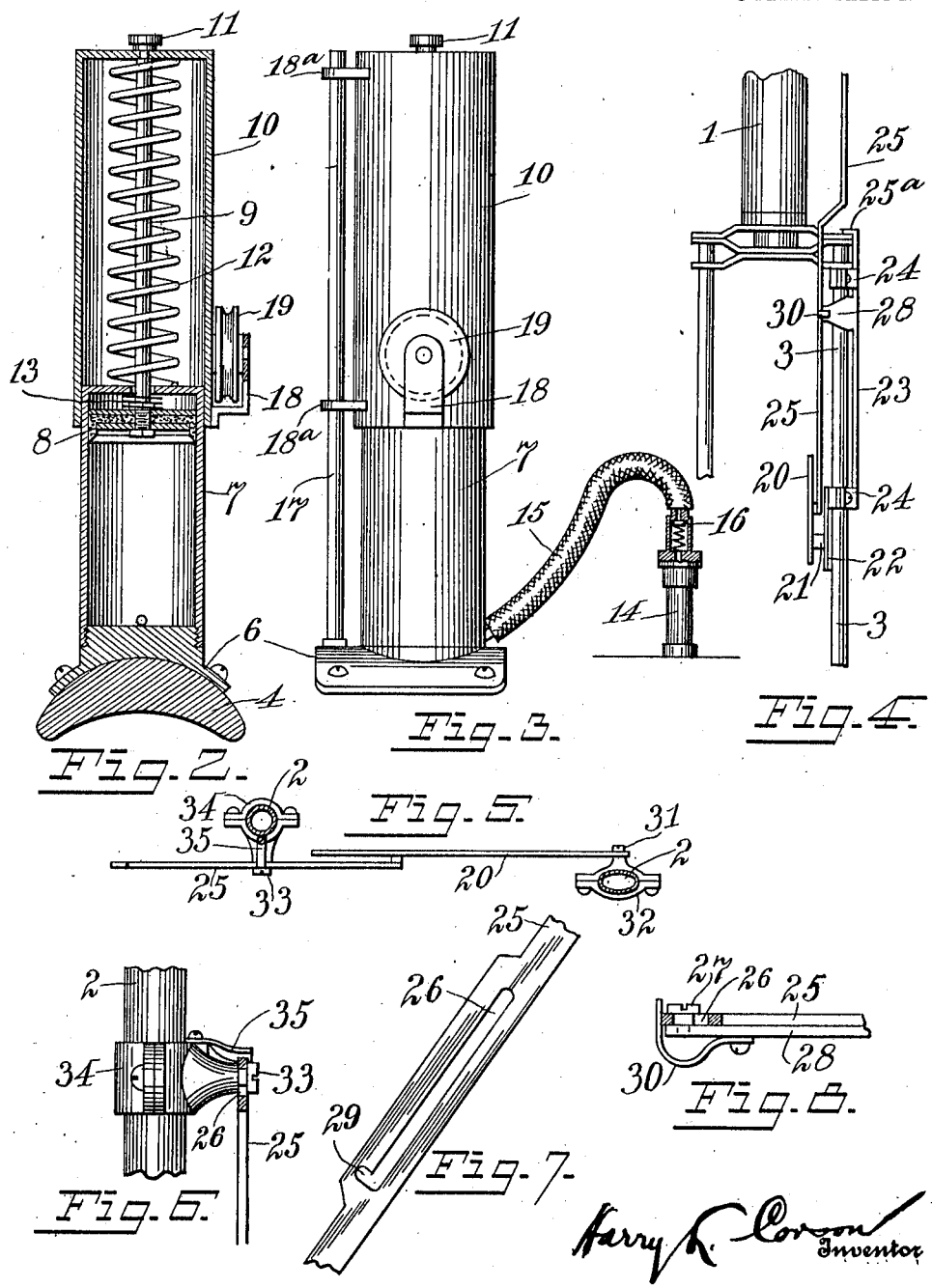

HARRY L. CORSON, OF DAYTON, OHIO.

MEANS FOR INFLATING PNEUMATIC TIRES.

993,655.  Specification of Letters Patent.  Patented May 30, 1911.

Application filed June 20, 1910. Serial No. 567,853.

*To all whom it may concern:*

Be it known that I, HARRY L. CORSON, a citizen of the United States, residing at Dayton, in the county of Montgomery and State of Ohio, have invented certain new and useful Improvements in Means for Inflating Pneumatic Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for inflating pneumatic tires.

The devices are adapted to be used on the pneumatic tires of bicycles, motorcycles and automobiles.

The object of the invention is to provide a device of the above type.

In the drawings I have illustrated my invention in connection with a bicycle wheel.

Referring to said drawings, Figure 1 is a side elevation of a bicycle with the front and rear wheels equipped with my invention. Fig. 2 is a longitudinal section through the pump. Fig. 3 is a side elevation of the pump. Fig. 4 is a front elevation of the front fork of the bicycle, showing the actuating cam bar attached thereto. Fig. 5 is a plan view of the cam or bar which actuates the pump on the rear wheel. Fig. 6 is a detail of the holding mechanism for the rear cam. Fig. 7 is a detail of the slot in the cam setting rods, and Fig. 8 is a detail of the holding mechanism for the front cam.

Throughout the specification and drawings, similar reference characters indicate corresponding parts.

Referring more particularly to the drawings, 1 designates a bicycle frame having a rear portion 2, and provided with a front fork 3. Mounted within said rear portion 2 and the front fork 3, are wheels 4 equipped with pneumatic tires 5, all of the above being common to the well known bicycle. Mounted on each of the wheels 4 is a base member 6, which supports a cylinder 7. Adapted to reciprocate in the cylinder 7, is a piston 8 mounted on a piston rod 9 which extends out through the head of the cylinder 7. The outer end of the piston rod 9 is attached to the head of a cylinder 10 by means of a thumb nut 11. The cylinder 10 is telescoped on the air cylinder 7, and its purpose is to protect the air cylinder from dirt or other substances. A spring 12 is provided to move the piston to an inner or upper position after said piston has been moved downward to compress the air by means hereinafter described. There is also provided a cushion spring 13 between the piston 8 and the head of the cylinder 7, which prevents pounding of the piston when said piston is moving inwardly. The piston 7 is connected to a valve 14 of the tire 5 by a flexible connection 15, through which the air passes from the cylinder to the tire. An auxiliary valve 16 may be provided, which prevents escape of the air from the tire 5 should the main valve 14 fail, see Fig. 3. To prevent the guide cylinder 10 rotating or twisting on the cylinder 7, there is provided a rod 17 which extends upwardly from the base member 6, through guides 18ª on the cylinder 10. The pump cylinder 7 and the guide cylinder 10 fit closely, therefore water or other foreign substances are prevented from entering the pump cylinder.

The piston 8, the piston rod 9 and the cylinder 10 are reciprocated to compress the air to inflate the tire as follows. Mounted on the side of the cylinder 10 and supported by a bracket 18 is a grooved roller 19 of any suitable material. This roller 19 is adapted to engage a movable curved bar or cam 20, the mounting of which may be varied to suit the vehicle to which the device is attached. As shown in the drawings, the forward cam 20 is pivoted at 21 to a bracket 22 attached to a frame 23. The frame 23 is attached to the front fork 3 by clips 24 and is provided with a clip 25ª which prevents said frame sliding on the fork. The cam 20 is rocked on its pivot by a rod 25 provided with a slot 26 which straddles a pin 27 on a bracket 28 extending from the frame 23. When the cam 20 is in a lower position, it is radial with the center of the wheel and is inoperative, as it is not engaged by the roller 19 during the rotation of the wheel. When said cam 20 is in an upper position, or that shown in dotted lines on the forward wheel, the roller 19 will contact with the cam 20, during the rotation of the wheel, and will actuate the cylinder 10, thereby moving the piston 8 outwardly, compressing the air therein and forcing it into the tire 5 through the connection 15, and valves 14 and 16. The cam 20 may be held in its upper position by a notch 29 adapted to receive a pin 27, said pin being held within the notch by a spring 30, see Fig. 7. The rear cam 20 is actuated similar to the forward cam and is pivoted at 31 to a clip 32 attached to the rear frame portion 2. The cam 20 is also provided with a rod 25 which straddles a pin 33 mounted on a clip 34. The rear rod 25 is also provided with a notch 29 which is held on the pin 33 by a spring 35 when the rear cam is in a set position, see Fig. 6. The rods 25 are within reach of the rider, and when he desires to inflate the tires, he may set the cams 20 by means of said levers, thereby allowing the roller 19 to contact with the cams which actuate the pumps and thereby inflate the tires.

I claim:

1. In a device of the type specified, the combination with a vehicle wheel having a pneumatic tire, of an air cylinder mounted on the rim of said wheel and communicating with the interior of the tire, a piston in said air cylinder having a rod extending therefrom, a protecting cylinder telescoped on said air cylinder and connected with the piston rod, a compression spring in said protecting cylinder, an anti-friction contact member on said protecting cylinder, an actuating bar in the path of said contact member and adapted to move the protecting cylinder and the piston in the direction to compress air in the air cylinder as said cylinder is carried around by the wheel, and a lever connected to said actuating bar for controlling the position of said bar, substantially as specified.

2. In a device of the type specified, the combination with a vehicle wheel having a pneumatic tire, of an air cylinder attached to the rim of said wheel and communicating with the interior of the tire, a piston in said air cylinder, a protecting cylinder telescoped on the air cylinder, a piston rod connecting the piston and the protecting cylinder, a spring inclosing said piston rod within the protecting cylinder and adapted to return said cylinder and the piston to a normal position, an actuating bar adapted to move said protecting cylinder and the piston as they are carried around with the wheel, and to compress the air in the air cylinder, means for holding the protecting cylinder from rotating on the air cylinder, and a lever pivoted to the actuating bar, and controlling the position of said bar.

In testimony whereof I affix my signature, in presence of two witnesses.

HARRY L. CORSON.

Witnesses:
R. J. McCarty,
Howard S. Smith.